United States Patent
Olsson (10) Patent No.: US 7,457,476 B2
(45) Date of Patent: Nov. 25, 2008

(54) OPTICAL SENSOR DEVICE AND A METHOD OF CONTROLLING ITS EXPOSURE TIME

(75) Inventor: Andreas Olsson, Lund (SE)

(73) Assignee: Anoto AB, Lund (SE)

( * ) Notice: Subject to any disclaimer, the term of this patent is extended or adjusted under 35 U.S.C. 154(b) by 875 days.

(21) Appl. No.: 10/262,943

(22) Filed: Oct. 3, 2002

(65) Prior Publication Data

US 2003/0189664 A1    Oct. 9, 2003

Related U.S. Application Data

(60) Provisional application No. 60/328,104, filed on Oct. 11, 2001.

(30) Foreign Application Priority Data

Oct. 3, 2001    (SE)    ................... 0103286-1

(51) Int. Cl.
G06K 9/40    (2006.01)
G03B 7/00    (2006.01)
H04N 5/235    (2006.01)

(52) U.S. Cl. ...................... 382/274; 348/362

(58) Field of Classification Search ................. 382/140, 382/274, 100; 235/462.01; 348/207.99, 348/296, 362

See application file for complete search history.

(56) References Cited

U.S. PATENT DOCUMENTS

| | | | |
|---|---|---|---|
| 5,223,935 A | 6/1993 | Tsuji et al. | |
| 5,661,506 A | 8/1997 | Lazzouni et al. | |
| 5,702,059 A * | 12/1997 | Chu et al. | ............. 235/472.01 |
| 5,764,611 A | 6/1998 | Watanabe | |
| 5,831,254 A | 11/1998 | Karpen et al. | |
| 5,852,434 A | 12/1998 | Sekendur | |
| 6,270,013 B1 | 8/2001 | Lipman et al. | |

FOREIGN PATENT DOCUMENTS

EP    0602637 A2    6/1994

(Continued)

OTHER PUBLICATIONS

HIR204 From Everlight Electronics Co, Ltd, No. 25 Land 76, sec 3, Chung Yang Rd., Ticheng 236, Tapei, Taiwan.

(Continued)

*Primary Examiner*—Matthew C. Bella
*Assistant Examiner*—Wesley Tucker
(74) *Attorney, Agent, or Firm*—Birch, Stewart, Kolasch and Birch, LLP (57) ABSTRACT

An optical sensor device has an illuminating light source and an image sensor. The image sensor captures a sequence of images under exposure of light from the light source. A controller in the optical sensor device has a control output and generates an exposure time control signal on the control output. The controller includes an exposure time control loop. Each iteration of the loop includes the steps: calculating an error between a set value and an actual luminance condition value determined in a current image in the sequence of images; calculating a current exposure time as a function of the error and an exposure time calculated during the preceding iteration of the control loop; and generating the exposure time control signal on the control output based on the current exposure time. The exposure time may thereby be determined so as to yield optimum contrast in an image which is to be captured by the image sensor.

41 Claims, 7 Drawing Sheets

FOREIGN PATENT DOCUMENTS

| | | |
|---|---|---|
| WO | WO 97/05560 A1 | 2/1997 |
| WO | WO 01/16691 A1 | 3/2001 |
| WO | WO 01/26032 A1 | 4/2001 |
| WO | WO 01/26033 A1 | 4/2001 |
| WO | PCT/SE02/01244 | 10/2002 |

OTHER PUBLICATIONS

Intelligent Paper, Marc Dymetman and Max Copperman, Xerox Research Centre Europe, pp. 392-406, XP-002328425.

Tim Wescott, PID Without a PhD, Embedded Systems Programming, Miller Freeman, San Francisco, CA, US, 2000, pp. 86-108.

* cited by examiner

OPTICAL SENSOR DEVICE AND A METHOD OF CONTROLLING ITS EXPOSURE TIME

This application claims priority on provisional Application No. 60/328,104 filed on Oct. 11, 2001, the entire contents of which are hereby incorporated by reference.

FIELD OF THE INVENTION

Generally speaking, the present invention relates to the fields of digital communication, digital image processing and image-capturing hand-held devices. More specifically, the present invention concerns an optical sensor device having an illuminating light source and an image sensor, wherein the image sensor is adapted to capture a sequence of images under exposure of light from the light source. The invention also concerns a method of controlling the exposure time of such an optical sensor device.

BACKGROUND OF THE INVENTION

Image-capturing hand-held devices of the above type are widely used. For instance, a digital pen is shown in Applicant's published international application WO 01/16691, which is incorporated herein by reference. As described in WO 01/16691, the digital pen may be used together with a product which has a writing surface and a position code provided thereon. The position code encodes a plurality of positions on the surface and may be detected by the digital pen. Thus, information which is being written on the writing surface by means of the digital pen can be electronically recorded by the pen.

In a position-coding product of the above or other types, the code is often represented by a graphical pattern of geometrical objects, marks or symbols, such as empty or filled circles (dots), squares, triangles, etc. The symbols may have uniform or varying appearance (size, color, etc), depending on the actual position coding principle involved. The surface of the product is provided with its position-coding pattern in a suitable way, such as by offset printing, laser printing, inkjet printing or thermal printing.

The digital pen operates by capturing a sequence of images, at a predetermined rate, of the surface of the product as the pen moves across it. In order to decode the position-coding pattern of objects in each captured image, the objects must be safely identified and not be confused with the background of the image. Separating the objects in an image from its background is sometimes referred to as segmentation or binarization. Successful segmentation is facilitated by optimal image quality and, in particular, optimal contrast, i.e. difference in color or greyscale luminance (intensity) between objects and background in the image.

However, image-capturing hand-held devices like the digital pen above are exposed to varying illumination environments due to the very nature of their intended use. For instance, as described in U.S. Pat. No. 5,764,611, a hand-held image-capturing device is typically not held perpendicularly to the surface to be scanned but rather at a varying angle of inclination with respect to the surface. To accurately reproduce the information contained in an image which is captured at an arbitrary inclination, U.S. Pat. No. 5,764,611 proposes use of an inclination sensor in combination with a luminance level detection circuit and a luminance variation calculation circuit. In more detail, the luminance level detection circuit detects average luminance data for each of a predetermined number of sub-areas of an image captured by an image sensor. Each sub-area is low-pass filtered so as to remove effects caused by the objects (black dots) in the image. Thus, the filtered image subareas predominantly contain background data. Average luminance level data are obtained stepwise for the subareas and are accumulated into an average luminance level for the entire image. This average luminance level is used for automatic gain control (AGC) of an image pickup process circuit, which is coupled to the image sensor.

The solution according to U.S. Pat. No. 5,764,611 has a drawback in that it requires complex circuitry in order to perform automatic gain control for the image pickup process circuit. In particular, such automatic gain control will amplify not only the desired portions of the image (i.e., the image signal from the image sensor) but also any noise included therein. Therefore, since noise is inevitable in reality, it is difficult to obtain optimum image contrast by amplifying the image signal.

In addition, many other factors than the inclination angle of the device with respect to the recording surface will contribute to a varying illumination environment for hand-held image-capturing devices. For instance, infrared light emitting diodes (IR LEDs), which are commonly used as illuminating light sources in hand-held image-capturing devices, have a specific irradiance (illumination power), which varies widely between individual diodes. Moreover, light emitting diodes are typically expected to decrease their output power with as much as 50% during their operational lifetime.

Furthermore, external sources of illumination, such as sunlight, may affect the illumination environment. Also, the light scattering or reflecting properties are different for different recording surface materials and may also vary between different parts of the recording surface (e.g. between a paper background and the dots printed thereon).

Consequently, the illumination environment depends on many different parameters, which are difficult to compensate fully and dynamically for by adjusting the image sensor itself or the image processing circuitry, which is coupled to the image sensor. In any event, such compensation would require complex circuitry, which is expensive in terms of processing power as well as component costs.

Generally speaking, digital pens are consumer products and should therefore be manufactured at low cost. Manufacturing cost is increased by either the usage of high-precision data capture components, or the need to trim every manufactured pen to accommodate for variations in its illumination system and/or image detection system, as caused by manufacture or assembly. In a consumer product, it is also undesirable to have the user periodically recalibrate the pen to accommodate for temporal changes of the illumination system. Also, it is objectionable to put severe constraints on the digital pen usage, for example in terms of allowable writing angles, allowable surface materials, and allowable writing environments. This is contrasted by the fact that the digital pen may not be used for writing under such conditions that more than an occasional image in the sequence of images is undecodable, since any resulting errors in the decoding adversely affects the quality of the electronic version of the handwritten information.

The foregoing problem discussion is at least partly applicable to other types of image-capturing devices, which operate under varying illumination conditions and interpret, identify, decode or otherwise read information contained in captured images.

The prior art comprises such devices with exposure control. WO 97/05560 discloses a so-called dataform reader which uses a prestored look-up table to determine a subsequent exposure time, based on a current sensor gain value and a property of a current image. Such a look-up table limits the use of the reader to well-defined, pre-calibrated conditions. U.S. Pat. No. 5,223,935 discloses an electronic still camera with automatic exposure control in which prestored conversion tables are used to set the exposure time. EP-0 602 637 and U.S. Pat. No. 5,831,254 disclose bar code readers which adjust an exposure time control signal to a light source and an image sensor, respectively, by a predetermined amount until a property of the resulting images is found to be acceptable. Whenever used outside a specific operation condition, such bar code readers are likely to exhibit a lengthy adjustment phase or instabilities, leading to a potential loss of information in a considerable number of captured images.

SUMMARY OF THE INVENTION

In view of the above, an objective of the invention is to provide a solution to the problems discussed above and to provide an efficient way of obtaining optimal image quality for an optical sensor device having an illuminating light source and an image sensor.

In particular, an objective in to provide optimum, or at least adequate, image contrast between background and objects in images which are produced by a hand-held image-capturing device in a potentially varying or uncertain illumination environment, so as to maximize the ability to interpret, identify, decode or otherwise read information that is represented by the objects in the captured images.

Generally, the above objectives are wholly or at least partly achieved by a method and a device according to the attached independent patent claims. Preferred embodiments of invention are set forth in the attached dependent claims.

A first aspect of the invention is a method for exposure time control in an optical sensor device of the type having an illuminating light source and an image sensor for capturing a sequence of images under exposure of light from the light source. The method involves forming an exposure time control loop, wherein each iteration of the control loop involves: capturing a current image under exposure of light from the light source during an exposure time calculated during the preceding iteration; determining an actual luminance condition value in the current image; calculating an error between a set value and the actual luminance condition value; and calculating a current exposure time as a function of the preceding exposure time and the error.

A second aspect of the invention is a computer program product directly loadable into a memory of a processor, where the computer program product comprises program code for performing the method according to the first aspect when executed by the processor.

A third aspect of the invention is an integrated circuit, which is adapted to perform the method according to the first aspect.

A fourth aspect of the invention is a hand-held image-producing apparatus comprising either the computer program product according to the second aspect or the integrated circuit according to the third aspect.

A fifth aspect of the invention is an optical sensor device comprising an illuminating light source and an image sensor. The image sensor is adapted to capture a sequence of images under exposure of light from the light source. The optical sensor device further comprises a controller having a control output and being adapted to generate an exposure time control signal on the control output. The controller comprises an exposure time control loop, wherein each iteration of the control loop involves: calculating an error between a set value and an actual luminance condition value determined in a current image in said sequence of images; calculating a current exposure time as a function of the error and an exposure time calculated during the preceding iteration of the control loop; and generating the exposure time control signal on the control output based on the current exposure time.

BRIEF DESCRIPTION OF THE DRAWINGS

A preferred embodiment of the present invention will now be described in more detail, reference being made to the enclosed drawings, in which.

DETAILED DISCLOSURE OF EMBODIMENTS

A. General Overview of Preferred Embodiment

Figure 1:
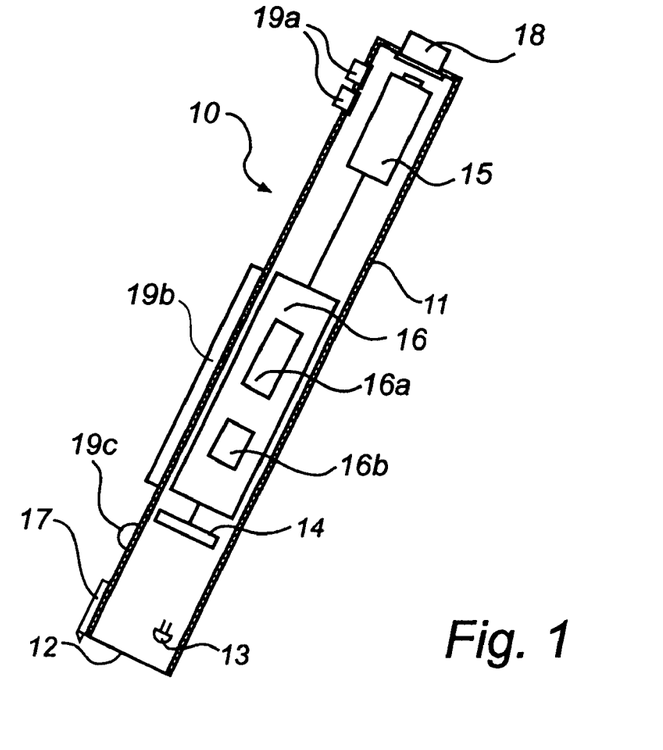
FIG. 1 is a schematic view of a hand-held sensor device according to the preferred embodiment, FIG. 2 schematically illustrates a set of 4×4 objects in a position-coding pattern, which can be detected by the sensor device of FIG. 1.

A preferred embodiment will now be described with reference to the hand-held sensor device 10 of FIGS. 1 and 3, which is used as a digital pen in combination with a position-coding pattern 20 of FIG. 2. However, it is to be emphasized, again, that the invention is in no way limited to such a sensor device or position-coding pattern. On the contrary, these are used for exemplifying purposes only.

The position-coding pattern 20 is described in detail in WO 01/16691, WO 01/26032 and WO 01/26033, all of which are hereby incorporated herein by reference. Also the sensor device 10, with the exceptions given below, is described in detail in aforesaid WO 01/16691, WO 01/26032 and WO 01/26033. A brief description of first the general components of the sensor device 10 and then the position-coding pattern 20 will follow below.

The sensor device 10 has a casing 11 having approximately the same shape as a conventional highlighter pen. One short side of the casing has a window 12, through which images recorded.

Principally, the casing 11 contains an optics part, an electronics part and a power supply.

The optics part comprises at least one illuminating light source 13, a lens system 31 (shown in FIG. 3), and an optical image sensor 14. The light source 13, which will be described in more detail later, is intended to illuminate a surface 32 (shown in FIG. 3) of a product, which lies within the range of vision of the window 12. The surface 32 contains the position-coding pattern 20. Through the lens system, an image of the surface 32 will be projected onto the image sensor 14.

In the preferred embodiment, the power supply of the sensor device 10 is a battery 15, but it can alternatively be a mains connection (not shown).

The electronics part 16 comprises a main processing device 16a together with associated storage means 16b. The main processing device 16a is responsible for the various functionality of the sensor device 10 and may preferably be implemented by a commercially available microprocessor such as a CPU ("Central Processing Unit"), a DSP ("Digital Signal Processor") or another programmable logic device such as an FPGA, or alternatively as an ASIC ("Application-Specific Integrated Circuit"), as discrete analog and digital components, or in any combination thereof.

The storage means 16b preferably includes various types of memory, such as a work memory (RAM) and a read-only memory (ROM). Associated programs are stored in the storage means 16b and will perform the functionality of the sensor device 10 when executed by the main processing device 16a.

A conventional pen point 17 is provided on the casing 11. By means of the pen point 17, the user may write or sketch physically on the product surface 32 through deposition of an ordinary pigment-based marking fluid onto the surface. Preferably, the marking fluid of the pen point 17 is transparent to infrared light so as to avoid interference with the optoelectronic detection of the sensor device 10, which, as will be explained below, is carried out by means of infrared light.

The electronics part further comprises a transceiver 18 for transmitting information to/from an external apparatus, such as a computer, a PDA or a mobile telephone. The transceiver 18 is preferably adapted for short-range radio communication in accordance with, e.g., the Bluetooth standard in the 2.4 GHz ISM band ("Industrial, Scientific and Medical"). The transceiver can, however, alternatively be adapted for infrared communication (such as IrDA—"Infrared Data Association"), or wire-based serial communication (such as RS232), or essentially any other available standard for short-range communication between a hand-held device and an external apparatus.

Additionally, the electronics part may comprise buttons 19a, by means of which the user can control the operation of the sensor device 10. The sensor device 10 may also comprise a display 19b, such as a liquid crystal display (LCD), and a status indication lamp 19c.

Figure 2:
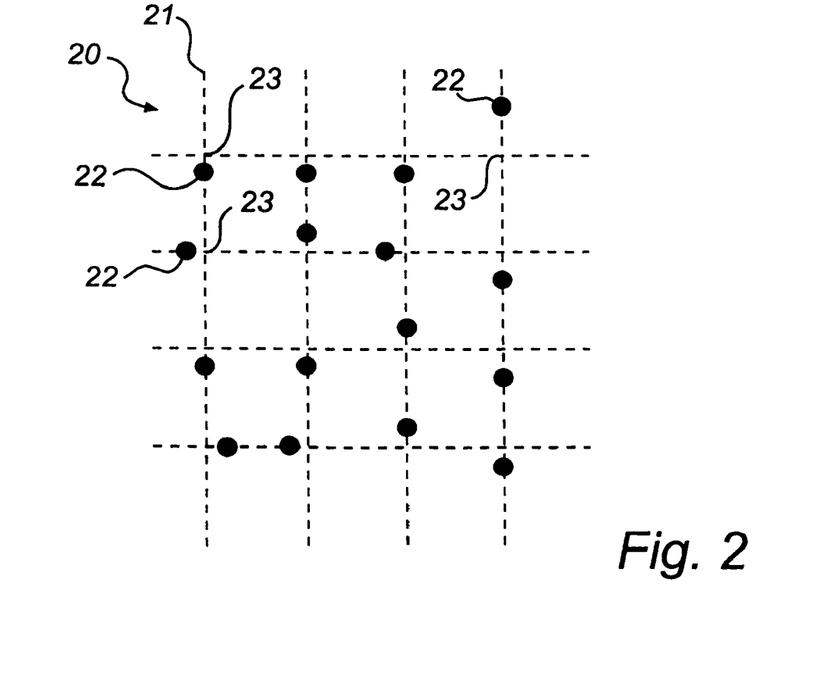

With reference to FIG. 2, the position-coding pattern 20 comprises a virtual raster 21, around which a plurality of marks 22 are formed. Each mark represents one of four possible values, "1" to "4". The value of each mark is represented by its actual position 22 in relation to its nominal position 23, where the latter is at the intersection between a respective horizontal and vertical line of the raster 21. Thus, each mark 22 can be located in one of four different positions that are displaced in orthogonal directions from the nominal position 23. The displacement is advantageously not less than about ⅛ and not more than about ¼, preferably about ⅙, of the distance between adjacent raster lines.

The distance between adjacent raster lines may for instance be about 300 μm or 254 μm. The latter distance is particularly suitable for printers and scanners, which often have a resolution of a multiple of 100 dpi (dots per inch).

Each mark 22 is constituted by a substantially circular dot having a radius, which advantageously is about 25% to 120% of the displacement of the dot from the nominal position 23. Alternatively, the marks 22 can have other geometrical shapes than circular, such as rectangular, triangular, elliptical, and may moreover be filled or outlined.

The position-coding pattern 20 can be designed to encode a very large number of absolute positions. For instance, 6×6 adjacent marks may jointly encode a position having x and y coordinates. By providing a surface of a product with a position-coding pattern 20, an electronic representation of information that is being written or sketched on the product surface can be obtained by means of a sensor device 10 by repeatedly capturing images of the surface as the sensor device 10 is moved across the surface. In these images, the marks 22 will appear as foreground objects, whereas the raster 21 is only virtual and will not appear in the images. Therefore, the background of the images will essentially represent the areas of the product surface where no marks 22 are present.

Figure 3:
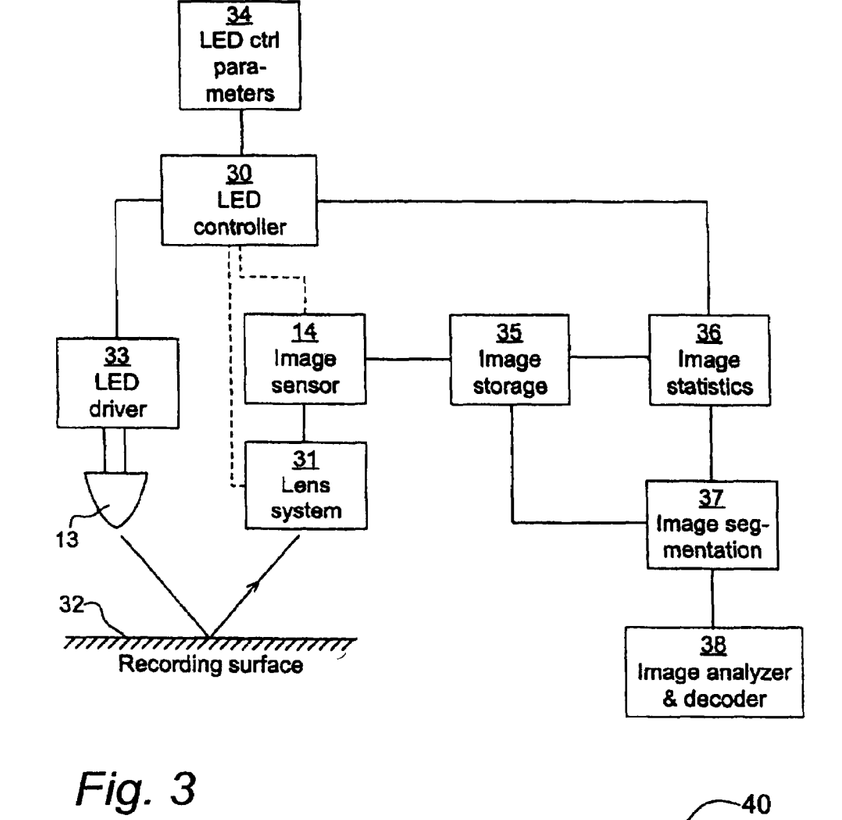
FIG. 3 is a block diagram, which illustrates central parts, within the context of the present invention, of the sensor device shown in FIG. 1.

Reference is now made to FIG. 3, which contains a more detailed illustration of some portions of the electronics part 16 of the sensor device 10. At least some of the components in FIG. 3 may be realized by the main processing device 16a together with associated software in the storage means 16b. Alternatively, separate integrated circuits, discrete analog and/or digital components, or any combination thereof, may be used, as is readily understood by a man skilled in the art.

In the embodiment of FIG. 3, the illuminating light source 13 is an infrared light emitting diode, IR LED, which is driven by a LED driver 33. Therefore, the marks 22 of the position-coding pattern 20 are preferably printed with a dye that absorbs infrared light. IR LEDs are commercially available in numerous varieties, one example being the IR LED called HIR 204 from Everlight Electronics Co, Ltd, No. 25, Lane 76, Sec. 3, Chung Yang Rd., Tucheng 236, Taipei, Taiwan. HIR 204 comprises a GaAlAs chip and has a peak wavelength $\lambda_p$=850 nm.

The LED driver 33 provides supply voltage to the IR LED 13 during a certain exposure time, so that the IR LED 13 will illuminate the product surface 32, and the position-coding pattern 20 provided thereon, with infrared light, which is reflected from the surface 32 and is captured by the image sensor 14 through the lens system 31.

The image sensor 14 is an area sensor, such as a CMOS sensor or a CCD sensor, which is commercially available from e.g. Motorola or National Semiconductor, both of the USA. The image sensor 14 of the preferred embodiment is capable of producing 8-bit grayscale images in 96×96 pixel resolution at a rate of 100 images per second.

Images capture by the image sensor 14 are stored in an image storage 35, which comprises an electronic memory of suitable and commercially available type, such as a DRAM memory. Optionally, the image sensor 14 and the image storage 35 may be combined into one integrated circuit.

An image statistics module 36 acts as an interface to the image sensor 14/image storage 35 and also to a LED controller 30, as will be described later. A purpose of the image statistics module 36 is to provide statistics data for the captured image(s), to be used when pre-processing the image in an image segmentation module 37. Such statistics data may represent the statistic distribution of all possible image luminance (8-bit grayscale intensity) values for the pixels in the captured image.

In the preferred embodiment, though, the image statistics module 36 divides the captured image into a number of subimages with a size which is chosen in view of the position-coding pattern 20, so that each subimage will predominantly contain background and, thus, only to a minor extent marks 22. The maximum luminance value in each subimage will represent the local background. The mean background luminance is then calculated as the mean of the subimages in the central part of the image, so as to avoid the effects of varying illumination over the image. For example, dark borders could result in a low mean background value, even if the central part is saturated. The calculated mean background luminance will then be used by aforesaid LED controller 30 when performing exposure time control, as will be described later with particular reference to FIG. 5.

Correspondingly, the image statistics module 36 calculates local minimum luminance values for the sub-images, to be used as local representations of the local image objects (marks 22) in an image segmentation module 37.

The statistics module is described in further detail in Applicant's international patent application PCT/SE02/01244, which is incorporated herein by reference. It is to be understood that the division of the captured image into subimages need not be a physical division. Normally, the subimages are imaginary and used only in extracting data from the image. Likewise, it should be clear that the mean background luminance in an image can be estimated in other ways. In one variant, the local background in each subimage is represented by a percentile value, e.g. in the range of about 80-95, of the luminance values within the subimage. In a further variant, the mean background luminance is calculated as the average of the luminance values in the image, or a subset thereof, optionally after having minimized the influence of any objects therein, e.g. by suitable filtering.

The image segmentation module 37 will perform segmentation or binarization of the captured image, i.e. separate the foreground image objects (corresponding to the marks 22 in the position-coding pattern 20) from the image background. Advantageously, such segmentation or binarization is performed by a threshold process, where the luminance values for individual image pixels are compared to a threshold value. In short, luminance values in excess of the threshold value is set to 1, otherwise to 0, or vice versa. Threshold processing can either be performed globally, where one threshold value is commonly applied to the entire image, or preferably locally, where the image is divided into subareas, which are given different threshold values. Threshold processing is well known in the art and forms no central part of the present invention. Examples are found in U.S. Pat. No. 5,764,611, which was referred to in the introductory section of this document, and in above-mentioned PCT SE02/01244.

After segmentation of the captured image, an image analyzer & decoder 38 performs the actual processing of the image of the position-coding pattern 20. The image analyzer & decoder 38 outputs absolute positions which have been decoded from the image. The decoding of the position-coding pattern into absolute positions is described in detail in aforesaid WO 01/16691, WO 01/26032 and WO 01/26033.

According to the invention, as already mentioned, the exposure time is controlled in view of the quality of an already captured image so as to improve the quality of the next image to be captured. In the preferred embodiment, this control is exercised by the LED controller 30. To this end, the LED controller 30 is coupled to the image statistics module 36, as seen in FIG. 3. The LED controller 30 is also coupled to an LED control parameter storage 34 for storing parameters, which are required by the LED controller 30. An output of the LED controller 30 is connected to an input of the LED driver 33. The LED controller 30 is adapted to calculate a new exposure time u(n) and to feed the new exposure time as a control signal to the LED driver 33, which will drive the IR LED 13 during the lapse of this new exposure time when capturing the next image. Thus, "exposure time" in the preferred embodiment refers to the time period during which the LED driver 33 causes the IR, LED 13 to emit infrared light during the capture of an individual image. The above will be described in more detail in the next section.

The LED controller 30 may be implemented as a processor (such as a CPU or DSP), or another programmable logic device such as an FPGA, together with program code stored in an associated memory. The LED controller 30 may alternatively be realized as an integrated circuit, as discrete logic gates together with other analog and digital components, or in any combination of the above.

B. Exposure Time Control in Preferred Embodiment

The operation and functionality of the exposure time control according to the preferred embodiment will now be described in detail with reference to the remaining figures. First, the typical illumination situation for a hand-held sensor device like the sensor device 10 will be discussed based upon an optical system responsivity function. Then, an exposure time control loop for an illuminating light source like the IR LED 13 will be presented.

I. Optical System Responsivity Function

The relationship between the exposure time (with constant supply current to the IR LED 13) and the luminance value in a captured image is referred to as an optical system responsivity function. This function describes the mean background luminance as a function of exposure time. The following parameters are relevant:

- The IR LED 13 has a specific radiance. Irradiance is expressed in [W/m2] and represents the illumination power incident on the surface 32 of the product. This power varies widely with the specific example of the IR LED as well as the angle of the sensor device 10 with respect to the surface.
- Depending on for example sunlight or other external illumination on the surface 32, additional illumination power may reach the image sensor 14.
- The surface 32 has a certain scattering distribution called BSDF (Bi-directional Scattering Distribution Function). BSDF*π is the reflectance and gives the amount of scattered illumination which is reflected in the surface 32. The surface 32 and its marks 22 have different BSDF.
- The lens system 31 dampens the power proportionally to the inverse of the f-number (f#) squared.
- The image sensor 14 has a sensor responsivity function that describes the intensity level in LSB (Least Significant Bit; the smallest pixel intensity unit, such as "00000001" for an 8-bit grayscale image) as a function of energy density.

The above can be expressed in the following equation:

$$(LED \ \text{Irradiance} + \text{External Illumination}) \cdot BSDF \cdot \pi \frac{1}{f_\#^2 + 1} t_{\exp} = \text{Energy density}[Ws/m^2]$$

Since the sensor responsivity function is described as a function of energy density, the optical system responsivity function differs from the sensor responsivity function only with a factor that varies depending on:

- Different IR LED's provide different illumination. In addition, the LED is expected to decrease its output power with 50% during its lifetime.
- Different inclination angles for the sensor device 10 give different irradiance.

Different product surfaces 32, e.g. different paper qualities, have different BSDF.

External illumination may increase the energy density on the image sensor 14.

Figure 6:
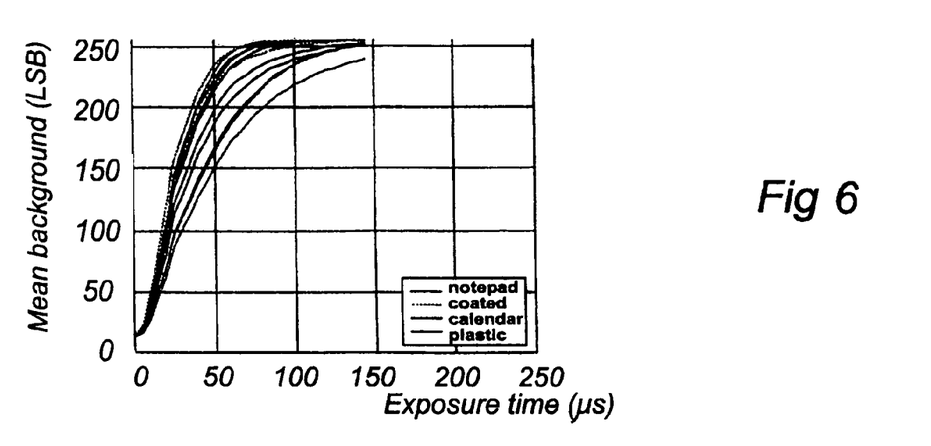
FIGS. 6-8 illustrate optical system responsivity functions for three illuminating light sources under different illumination conditions.
Figure 7:
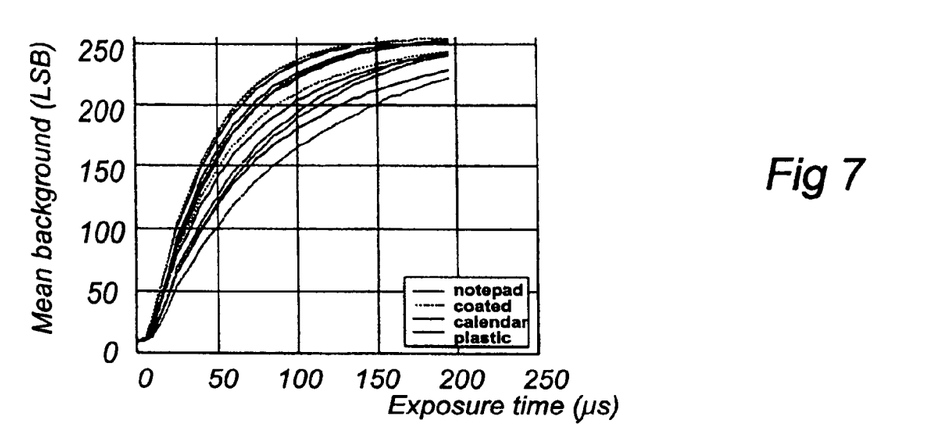
Figure 8:
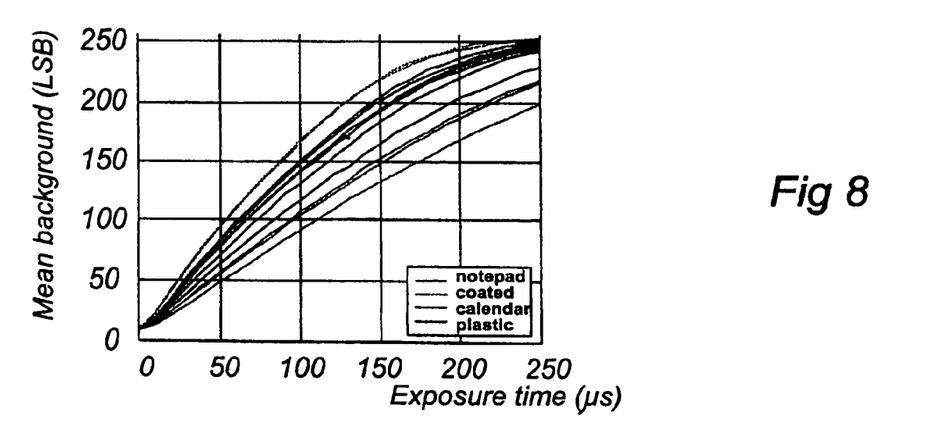

The above has been verified experimentally by measuring the mean image background luminance, in LSB, versus exposure time for three different individual IR LED's of the same type, with different inclination angles and different surface materials. FIGS. 6-8 illustrate the results. It is apparent how the three LED's have different irradiance. It also appears that the sensor responsivity is not perfectly linear and that its behavior is non-linear close to saturation.

II. Exposure Time Control Loop

In order to provide optimum image quality for successful interpretation of the captured images, with particular respect to image segmentation, optimum image contrast is desired between the marks 22 (i.e., the image objects) and the background.

Figure 9:
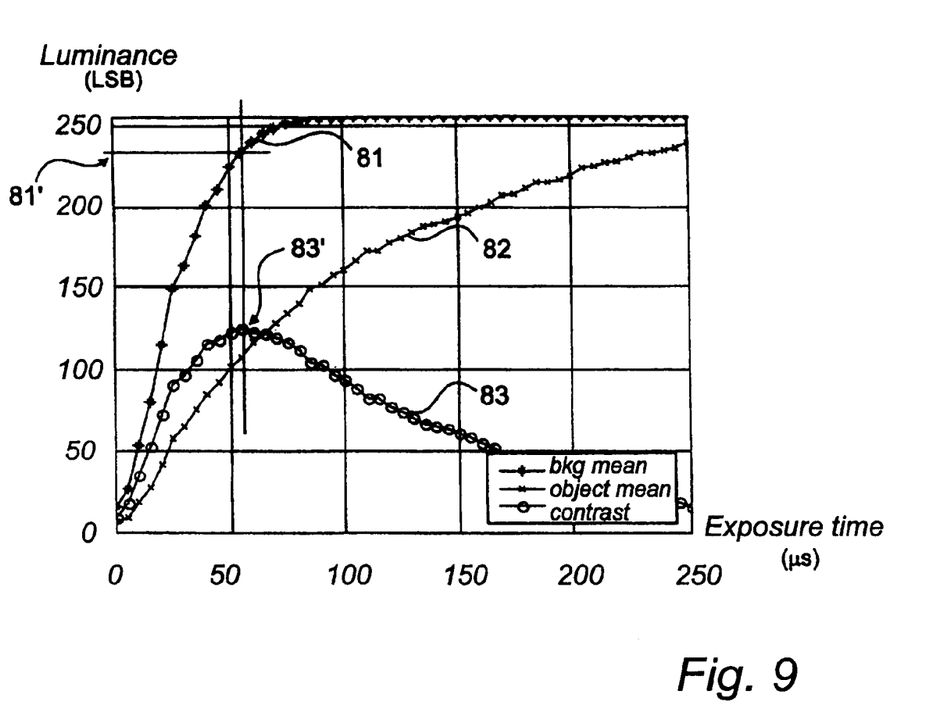
FIG. 9 is a schematic diagram which demonstrates the mean background luminance and the mean object luminance, respectively, as well as the contrast between them, as a function of exposure time.

FIG. 9 illustrates an optical stem responsivity function not only for the background (graph 81) but also for the marks (graph 82), as measured for a specific surface material, a specific dye for the marks, a specific IR LED and a specific inclination angle. The contrast is indicated by a graph 83. For a linear function, maximum contrast would always occur at the saturation point for the background luminance. After this point the contrast will start to decrease. However, since non-linearity is added due to saturation, optimum contrast 83' is in fact found a little bit below the saturation point for the mean background luminance, see 81'. The diagram will be similar for other environments, except that the slopes of the graphs will be different.

An important conclusion from the above is that optimum contrast and, therefore, a good image quality can be obtained despite a varying environment by controlling the exposure time of the IR LED, so that the image background luminance is held constant slightly below saturation.

Figure 4:
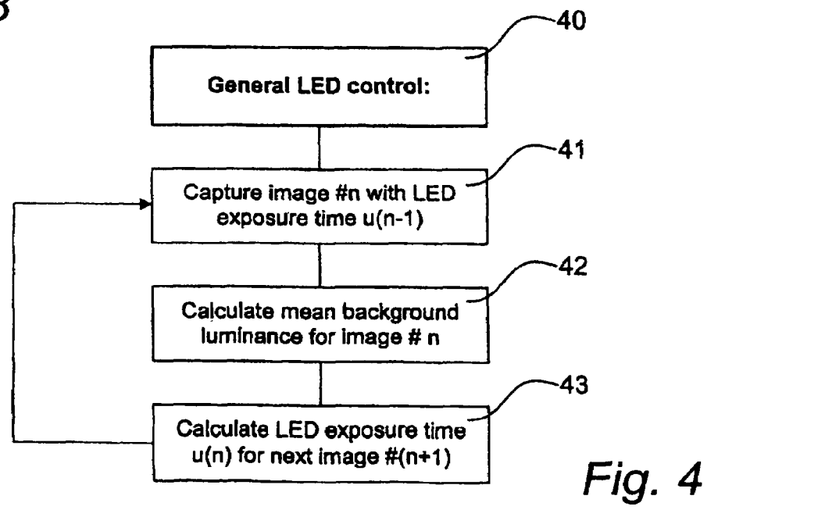
FIG. 4 is a flowchart diagram to illustrate the general steps of a method according to the preferred embodiment.

The overall procedural steps for obtaining the above through a general control loop 40 for the exposure time of the IR LED 13 is shown in FIG. 4. A particular image #n is captured by the image sensor 14 under a certain exposure time u(n−1) in a first step 41. In a second step 42, a mean background luminance is calculated for image #n. Then, a new exposure time u(n) is calculated in a third step 43. The new exposure time will be used when capturing the next image #(n+1). Following termination of step 43, the execution will return to step 41.

The general control loop 40 represents a first order system; the new exposure time is always calculated before the next image is captured. If the mean background luminance at time n is y(n) and if linear approximation is done around the set point, the resulting model function will be:

$$y(n)=k \cdot u(n-1)+L,$$

where k and L are parameters. Now, the control loop can be expressed as an ordinary PI loop:

$$u(n) = k_1(w(n) - y(n)) + k_2 \sum_{m=0}^{n} (w(m) - y(m)),$$

where w(n) is the desired mean background luminance. By defining $$\Delta u(n)=u(n)-u(n-1),$$

the summation may be eliminated by rewriting the control loop as $$\Delta u(n)=k(\Delta w(n)-\Delta y(n))+k_2(w(n)-y(n)).$$

This results in $$\Delta y(n)=k\Delta u(n-1)=kk_1(\Delta w(n-1)-\Delta y(n-1))+kk_2(w(n-1)-y(n-1)),$$

which can be rewritten and transformed to a closed loop transfer function $$G_c(z) = \frac{(kk_1 + kk_2)z^{-1} - kk_1 z^{-2}}{1 + (kk_1 + kk_2 - 1)z^{-1} - kk_1 z^{-2}}.$$

The poles of the closed loop transfer function are $$z = \frac{1 - kk_1 - kk_2}{2} \pm \sqrt{\frac{(1 - kk_1 - kk_2)^2}{4} + kk_1}.$$

As is well known per se, a basic criterion for stability is that all poles lie inside the unit circle. However, since k is always positive (cf. FIGS. 6-8), a positive $k_1$ will always give a negative real pole. This gives an oscillatory system with long decay, and therefore $k_1$ is set to $k_1 <= 0$. Now, the poles are investigated for different values of $k_1$ and $k_2$. If $k_1=0$, one pole will be equal to 0 and the other one will lie on the positive real axis. This will provide no oscillations. If $k_1$ is set to a negative value, a lower rise time but a more oscillatory step response is achieved due to complex poles. The overall speed is increased by increasing $k_2$.

Generally, the control system should be as fast as possible, but not at the expense of too much oscillations. Oscillations would increase the risk for a saturated image and failure in the position decoding. Simulations have shown that $k^*k_2=0.8$ or 0.9 and $k^*k_1=0$ or −0.1 might be suitable, but other values are of course possible.

A control loop equation will now be determined. Defining the error as e(n)=w(n)−y(n) gives:

$$\Delta u(n) = u(n) - u(n-1) = k_1 \Delta e(n) + k_2 e(n)$$

$$\Leftrightarrow$$

$$u(n) = u(n-1) + k_1(e(n) - e(n-1)) = k_2 e(n)$$

The integration is implicit in the equation itself, which is advantageous since integration windup problems are not of concern. In other words, if the output signal from the equation would become saturated at time n, the saturated value can simply be used, and at n+1 the equation can be used again, as if nothing had happened and without considering the past.

Another consideration is the pole placement, which is dependent on the value of k, which in turn will vary greatly depending on the operation condition of the sensor device, for example due to changes in inclination angle, surface property, external illumination and specific IR LED sample. If $k_1$ and $k_2$ are to be chosen as constants, they must be chosen according to the highest value of k in order to be sure that undesired oscillations will not occur at any time under any circumstances. At first glance, this would mean that in most cases, the control loop would be too slow to react on fast changes in the environment.

However, it is observed that y(n)=k·u(n−1)+L, but y(n)=w=constant in steady-state. Thus, if the model function is reasonably accurate, at least around the set value w, the value of k can be calculated instead of setting it to a constant:

$$k \cdot u(n-1) = w - L \Leftrightarrow k = \frac{w-L}{u(n-1)}.$$

Figure 10:
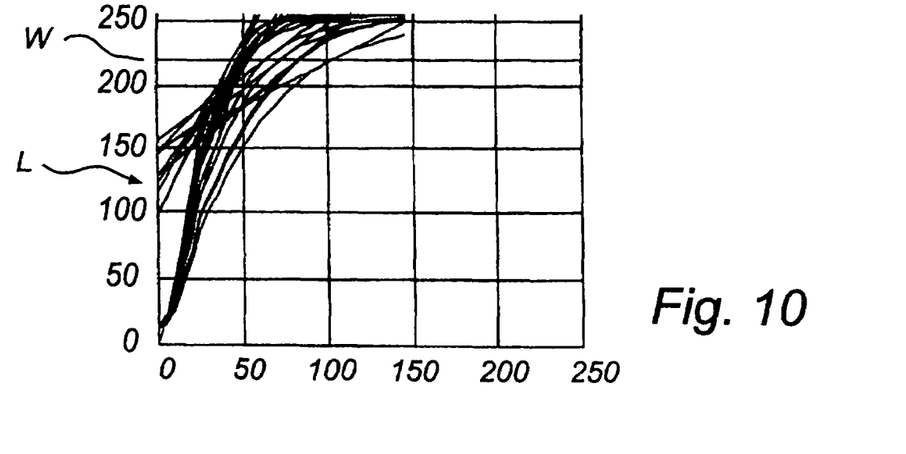
FIGS. 10-12 illustrate linear approximations around a particular background luminance set value for the three sets of graphs in FIGS. 6-8.
Figure 11:
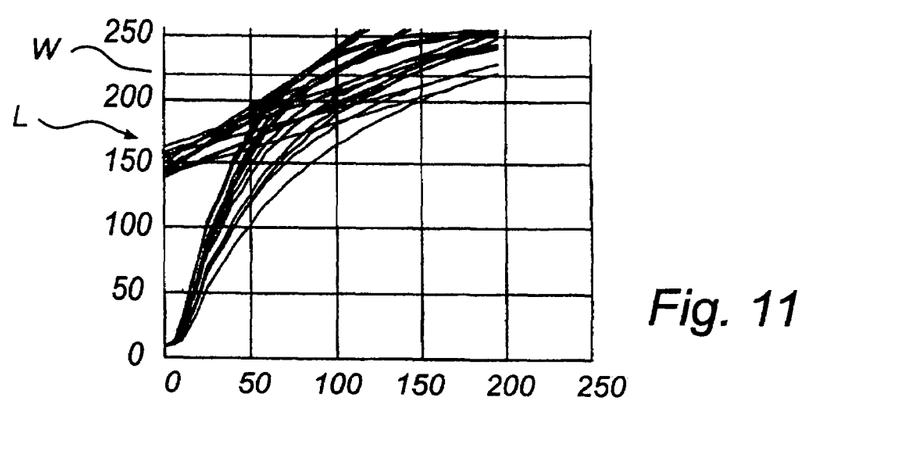
Figure 12:
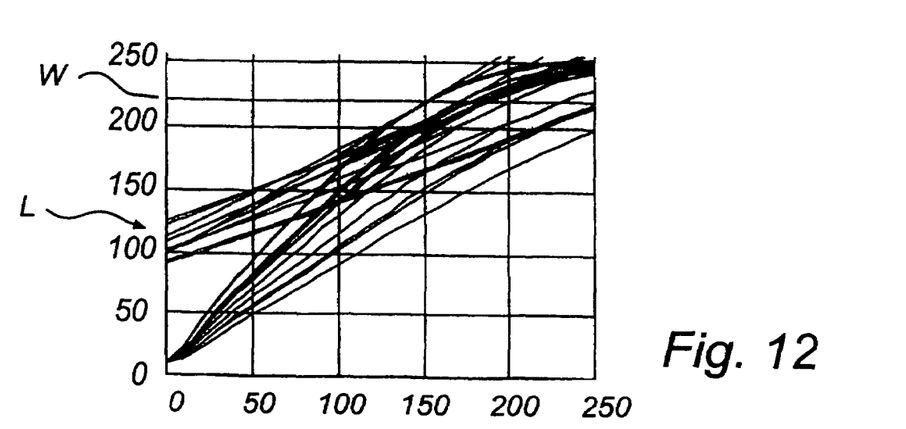

In deriving this equation, it is assumed that L is constant when linear approximation is done around the set value w. The validity of such an assumption is verified in FIGS. 10-12, which illustrate linear approximations around the set value w=220 for the three set of graphs from FIGS. 6-8. As in FIGS. 10-12, L is the intersection of the linear approximations with the y-axis. A reasonable value for L is about 100-150, say 125, when the set value w is 220.

With the above in mind the control system may be modified to have approximately constant poles by substituting k:

$$kk_1 = l_1 \Leftrightarrow k_1(n) = \frac{l_1}{w-L} u(n-1)$$

and $$kk_2 = l_2 \Leftrightarrow k_2(n) = \frac{l_2}{w-L} u(n-1).$$

This yields the final version of the exposure time control loop:

$$\begin{cases} u(n) = u(n-1) + k_1(n)(e(n) - e(n-1)) + k_2(n)e(n) \\ e(n) = w - y(n) \\ k_1(n) = \frac{l_1}{w-L} u(n-1) \\ k_2(n) = \frac{l_2}{w-L} u(n-1) \end{cases}$$

where $l_1$ and $l_2$ are chosen in accordance with the above discussions on stability and response time, w is the desired background luminance and L is the intersection with the y-axis when performing linear approximation around the set value on the optical system responsivity function.

Figure 13:
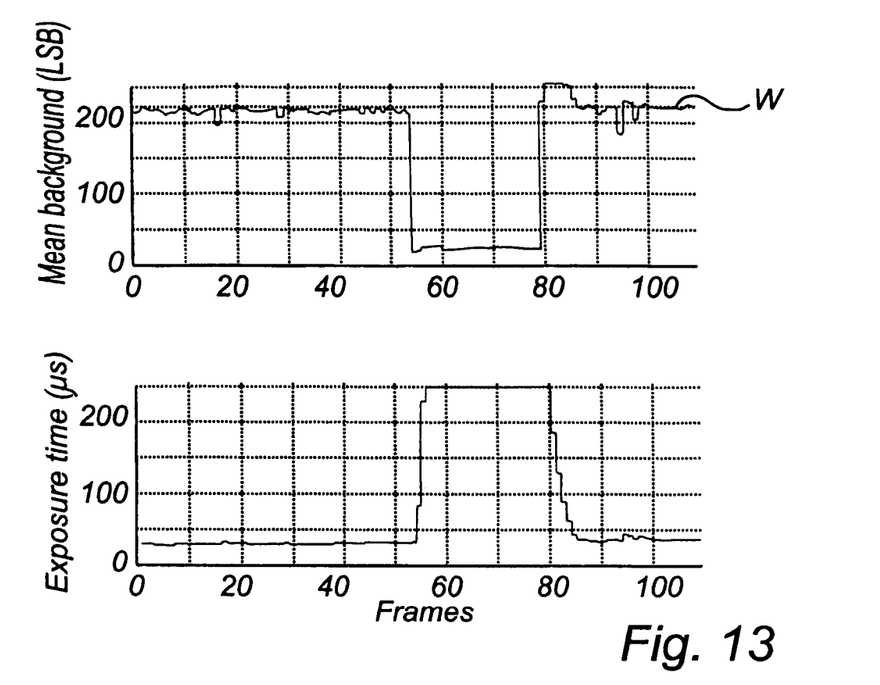
FIGS. 13-14 illustrate the dynamic behavior of the control loop for the sensor devices represented in FIGS. 10 and 12, respectively, wherein the top graph illustrates the mean background luminance in a sequence of images, and the bottom graph illustrates the corresponding exposure time as determined by the control loop.
Figure 14:
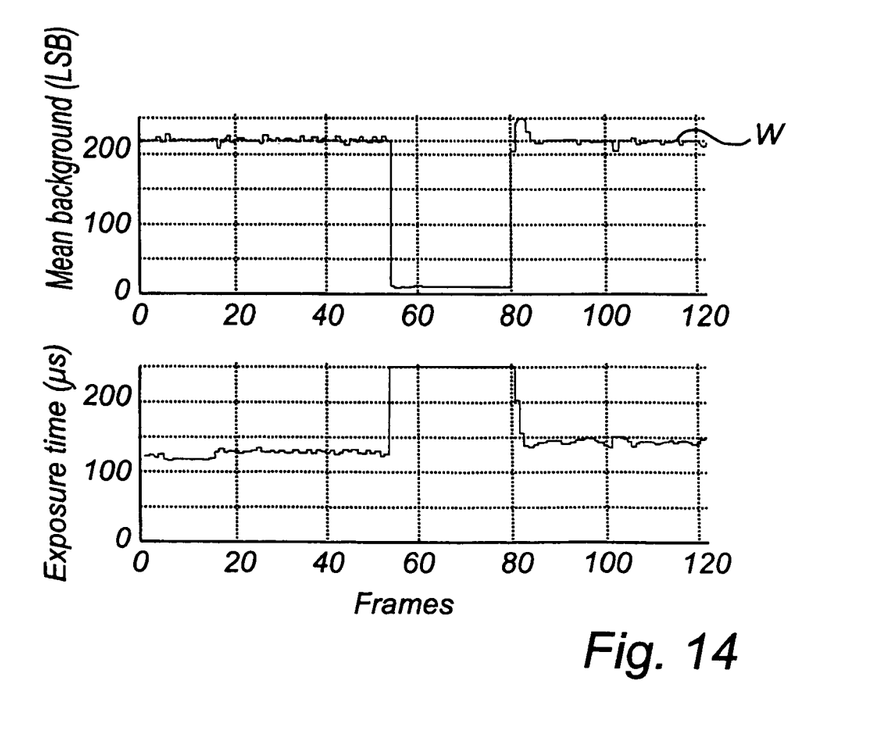

Determining the exact values of the control loop parameters $l_1$, $l_2$, w and L is merely a matter of tuning, which is well within reach of a skilled person. For instance, tests have proven that with $l_1$=−0.1, $l_2$=0.8, w=220 and L=125, the control loop will be capable of maintaining approximately constant mean background luminance for sensor devices comprising the three different IR LED samples having the optical system responsivity functions shown in FIGS. 6 and 8, even if the environment changes drastically due to rapid tilting of the sensor device, rapid switches between different surface materials, etc. This is further illustrated in FIGS. 13-14 which show the dynamic behavior of the control system for sensor devices having the optical system responsivity functions of FIGS. 6 and 8, respectively. The dynamic behavior was recorded under a test sequence in which the sensor device: 1) was used for writing a signature on a coated (glossy) paper, 2) was subjected to rapid changes in tilt angle during 40 frames (i.e. images), 3) was aimed into the air while pushing pen tip to activate the image sensor, and 4) was used for writing a signature on a uncoated paper. As seen from the top graphs, the control system exhibits a very fast response with only very small oscillations. During writing, every frame is thus adequately controlled so as to be useful in decoding. Further, it takes the system only about five frames to catch up after saturation in exposure time, as caused by the removal on the surface. Evidently, this fast and stable control system is achieved for both sensor devices, despite their differing responsivity functions.

As regards the set value w for the desired mean background luminance, values of about 80-90% of the maximum background luminance (i.e., between about 205 and about 230 when the maximum background luminance is 255) have proven useful for w. However, values in a wider range of about 50% to about 95% of the maximum background luminance are also possible for w.

As illustrated above, the control loop is designed to work with essentially constant poles. Generally speaking, the control loop is then based on a model function which represents a physical relation between the actual value y(n), in this case the mean background luminance, and the preceding exposure time u(n−1), and which is intermittently adjusted to a current operation condition of the sensor device, so that the control loop operates with essentially constant poles, independent of operation condition of the sensor device. Such adjustment may be achieved if the model function includes at least one model working point which is essentially common to all digital images in the sequence of images, i.e. for all operating conditions. In the above example, the model function is a linear first order function of exposure time, and the common mode working point is given by $(u,y)_{Common}$=(0, L).

A new exposure time can thus be calculated by parameterizing the model function on the basis of the preceding exposure time and the common model working point. The term parameterizing as used herein refers to a step of calculating such parameters (k in the above example) of the model function that are relevant to the poles of the corresponding closed loop transfer function. The parameters of the model function can be calculated intermittently, for example during each iteration of the control loop, whereupon corresponding control parameters of the control loop can be adaptively adjusted to achieve essentially constant poles.

It should perhaps be pointed out that the common model working point does not need to constitute an actual operating point for the working control loop. The model working point can thus lie outside the control region of the control loop and only be used as a secondary condition for calculating the model function parameters.

Figure 5:
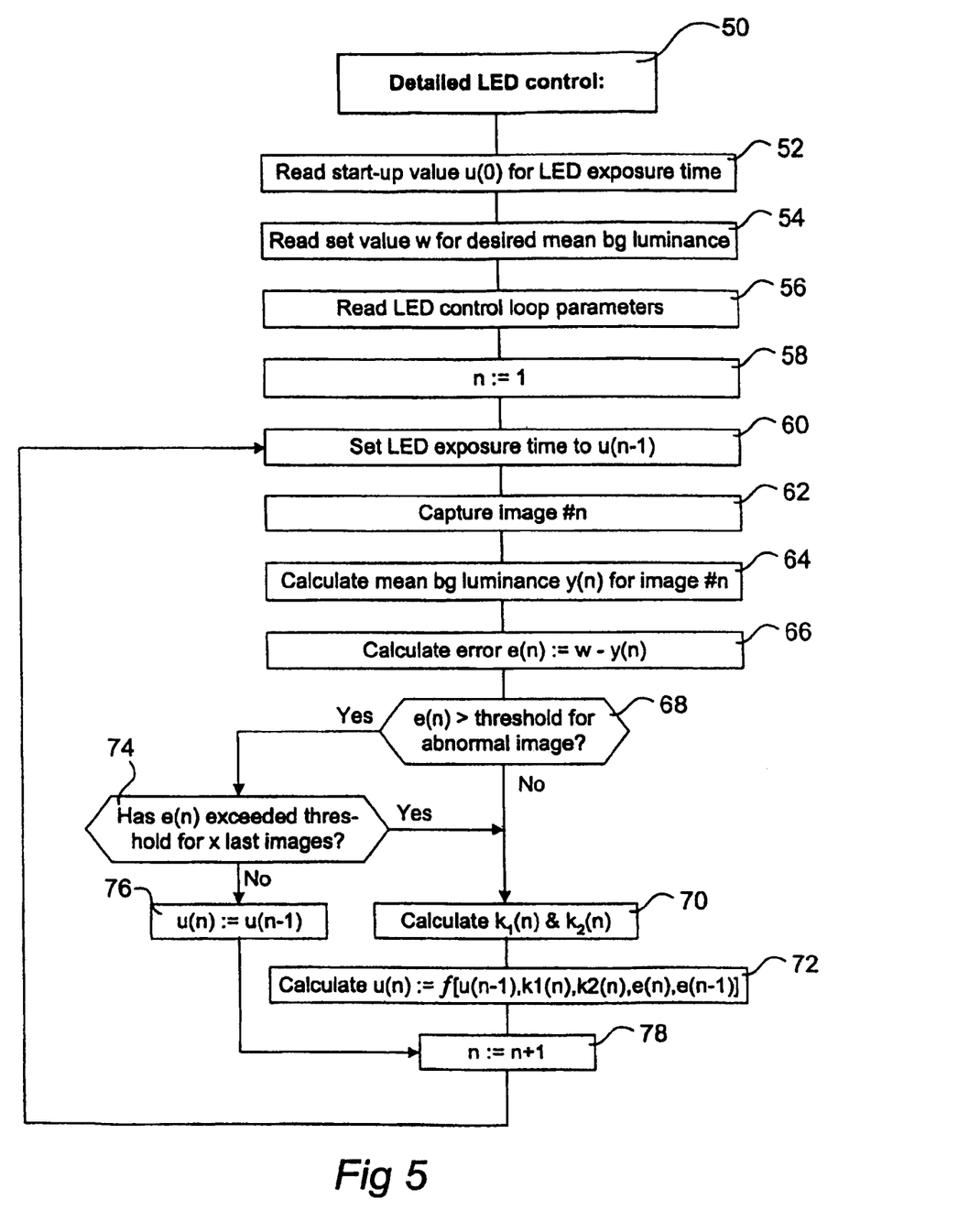
FIG. 5 is a flowchart diagram to illustrate the method of FIG. 4 in more detail.

Referring now to FIG. 5, a detailed implementation of the IR LED exposure time control loop 50 is as follows. In a first step 52, a start-up value u(0) for the IR LED exposure time is read by the LED controller 30 from the LED control parameter storage 34. The start-up value u(0) has been previously saved by the LED controller 30 at the end of the last use of the sensor device 10. Alternatively, the start-up value u(0) may be assigned a constant default value which is not updated between different use periods of the sensor device 10.

The set value w for the desired mean background luminance is read in step 54. Correspondingly, the remaining LED control loop parameters $l_1$, $l_2$ and L are read in step 56. A counted n is reset to 1 in step 58.

The main control loop starts in step 60. Here, the LED controller 30 sets the exposure time of the IR LED 13 to u(n−1) through the LED driver 33. An image #n is captured by the image sensor 14 in step 62 and is stored in the image storage 35.

The mean background luminance y(n) in image #n is obtained in step 64. To this end, various methods known per se may be utilized. Advantageously, however, the LED controller 30 uses the mean background luminance value calculated by the image statistics module 36 (see above).

The error e(n) is calculated in step 66. In step 68, a check for temporary abnormal image may be made by comparing e(n) to a predefined threshold value. If the check is in the affirmative, another check is made in step 74 whether e(n) has been continuously high for a number of preceding images. If so, image #n is not a temporary abnormal in image after all, and the execution returns to the main loop. On the other hand, if the check in step 74 was negative, i.e. e(n) has not been high for a number of preceding images, image #n is in fact a temporary abnormal image which should be disregarded from. In that case, the exposure time is kept unchanged by assigning u(n) to U(n−1) in step 76.

If the check in step 68 was negative, the normal execution continuous to step 70, where $k_1(n)$ and $k_2(n)$ are calculated as described above. Correspondingly, u(n) is calculated in the next step 72. Finally, n is incremented in step 78, and the execution returns to step 60, where the exposure time for the IR LED 13 is updated in preparation of the next image to be captured.

B. Alternative Embodiments

In an alternative embodiment extra care is given to the fact that the image quality of the objects (e.g. marks 22) themselves in the image is not always perfect. A less than perfect print quality will give less than perfect object contrast. Thus, not only the mean background luminance but also the mean object luminance is considered in the control loop. Preferably, the impact of the two on the total exposure time control is weighted, so that the difference between the mean background luminance and its set value will have stronger influence (e.g. a weight 0.8) than the corresponding difference between the mean object luminance and its set value (e.g. a weight 0.2).

In another embodiment, rather than performing the exposure time control by controlling a time period during which the IR LED 13 is caused to emit light, i.e. is kept turned on by the LED drive 33, the control output of the controller 30 is operatively coupled to the image sensor 14, as is indicated by a broken line in FIG. 3. Thus, in this embodiment the exposure time of the sensor device 10 is controlled in the term of the time period during which the image sensor 14 is kept active and responsive to incident light during the capture of an individual image. This time period is sometimes referred to as integration time for a CCD or CMOS image sensor and may be regarded as an electronic shutter. The time period may be set by writing a control value in an internal register of the image sensor. Thus, in this embodiment the exposure time is controlled from the controller 30 by updating the register value during each iteration of the control loop (more specifically, in step 60 of FIG. 5) to command the new exposure time.

In yet another embodiment the lens system 31 comprises an optical member such as an optomechanical shutter, which is positioned in an optical path between the IR LED 13 and the image sensor 14. In this case the control output of the controller 30 is operatively coupled to the optical member in the lens system 31, as is indicated by a broken line in FIG. 3, wherein the exposure time of the sensor device 10 is controlled in the form of a time period during which the optical member admits light emitted from the IR LED 13 to reach the image sensor 14 during the capture of an individual image.

In still another embodiment, instead of setting y(n) equal to the set value w in the parameterization of the model function y(n)=k·u(n−1)+L, so as to provide constant poles independent of operation condition as described above, the mean background luminance y(n) of the current image could be used. This approach could provide a faster control system. Parameterization based on the set value w, on the other hand, could provide for greater flexibility in selection of model function with adequate stability of the control system.

The invention has mainly been described above with reference to a preferred embodiment. However, other embodiments than the one disclosed above are equally possible within the scope of the invention, as defined by the appended patent claims.

For instance, the above-described PI regulator may also involve derivative control (D) in addition to proportional (P) and integrating (I) control, thereby in effect constituting a PID regulator. Moreover, linear control systems of higher order than 1, as well as non-linear control systems in general, may be used for the exposure time control.

Further, the model function need not be a linear function, but can be any suitable function approximating the relation between the actual value and the exposure time, at least around the set value. Examples of such functions include: polynomial functions of suitable degree, exponential functions of suitable base, logarithmic functions of suitable base, cyclometric functions, trigonometric functions, and combinations thereof. If the mode function includes more than two unknown parameters, it may however be necessary to identify further secondary conditions in order to be able to adjust or parameterize the model function in the control loop.

The invention claimed is:

1. A method for exposure time control in an optical sensor device of the type having an illuminating light source and an image sensor for capturing a sequence of images under exposure of light from said light source, wherein said sequence of images contain a position-coding pattern for decoding a sequence of positions of the optical sensor device, said method comprising capturing said sequence of images by repeatedly capturing images as the optical sensor device is moved, and transferring each captured image in said sequence of images to a processor for decoding the position of the optical sensor device, and, said method further comprising forming an exposure time control loop for controlling the exposure time for subsequently captured images in said sequence of images, wherein each iteration of the control loop involves:

capturing a current image in said sequence of images under exposure of light from said light source during an exposure time calculated during the preceding iteration;
   determining an actual luminance condition value in said current image;
   calculating an error between a set value and said actual luminance condition value; and
   calculating a current exposure time as a function of the preceding exposure time and said error, said current exposure time being used for capturing a subsequent image in said sequence of images.

2. The method according to claim 1, wherein determining said actual luminance condition value comprises calculating a mean background luminance in said current image.

3. The method according to claim 2, wherein said actual luminance condition value is determined by:

determining a maximum luminance value in each of a plurality of subsets of said current image; and
   calculating the mean background luminance as a mean of said maximum luminance values of said subsets.

4. The method according to claim 2, wherein said current exposure time is determined so as to yield, in a subsequent image which is captured in the following iteration of the control loop, a mean background luminance which is below saturation and approximately matches said set value.

5. The method according to claim 4, wherein said set value for mean background luminance is between about 50% and about 95%, and preferably between about 80% and about 90%, of a saturation level of said image sensor.

6. The method according to claim 1, wherein said current exposure time is calculated so as to yield optimum contrast between the background and at least one object in a subsequent image which is captured in the following iteration of the control loop.

7. The method according to claim 6, wherein said sequence of images contains a position-coding pattern and wherein said position-coding pattern includes said at least one object.

8. The method according to claim 1, wherein said set value is constant over time.

9. The method according to claim 1, wherein the control loop operates with essentially constant poles, independent of operation condition of said optical sensor device.

10. The method according to claim 1, wherein said control loop is based on a model function relating said actual luminance condition value to said preceding exposure time, wherein said method further comprises: intermittently adjusting said model function to a current operation condition of said optical sensor device, so that the control loop operates with essentially constant poles, independent of operation condition of said optical sensor device.

11. The method according to claim 1, wherein said control loop is based on a model function relating said actual luminance condition value to said preceding exposure time, said model function including at least one model function working point which is essentially common to all operation conditions of said optical sensor device, and wherein calculating said current exposure time comprises parameterizing said model function based on said preceding exposure time and said model function working point, so that the control loop operates with essentially constant poles, independent of operation condition of said optical sensor device.

12. The method according to claim 11, wherein said model function includes at least one parameter which is essentially invariant of operation condition of said optical sensor device, said parameter defining said model function working point, and wherein said the parameterization of said model function is based on said preceding exposure time and said at least one essentially invariant parameter.

13. The method according to claim 11, wherein parameterizing said model function includes setting said actual luminance condition value equal to said set value.

14. The method according to claim 11, wherein the parameterization of said model function is further based on said actual luminance condition value calculated for said current image.

15. The method according to claim 10, wherein said model function is defined around said set value.

16. A method according to claim 1, wherein said exposure time control loop is given by:

$$\begin{cases} u(n) = u(n-1) + k_1(n)(e(n) - e(n-1)) + k_2(n)e(n) \\ e(n) = w - y(n) \\ k_1(n) = \dfrac{l_1}{w-L} u(n-1) \\ k_2(n) = \dfrac{l_2}{w-L} u(n-1) \end{cases}$$

where:

u(n) and u(n−1) are the current exposure time and the exposure time calculated during the preceding iteration of the control loop, respectively, w is the set value, y(n) is the actual luminance condition value in said current image, and $l_1$, $l_2$ and L are constants.

17. The method according to claim 1, wherein determining said actual luminance condition value comprises calculating a mean background luminance as well as a mean object luminance in said current image.

18. The method according to claim 17, wherein determining said actual luminance condition value involves combining said mean background luminance and said mean object luminance such that said mean background luminance has stronger influence than the mean object luminance when calculating said current exposure time.

19. The method according to claim 1, wherein said exposure time is defined as a time period during which said light source is caused to emit light.

20. The method according to claim 1, wherein said exposure time is defined as a time period during which said image sensor is caused to capture one of said images.

21. The method according to claim 1, wherein said exposure time is defined as a time period during which light emitted from said light source is admitted to reach said image sensor.

22. A computer program product directly loadable into a memory of a processor, the computer program product comprising program code for performing the steps of claim 1 when executed by said processor.

23. An optical sensor device comprising an illuminating light source and an image sensor, wherein the image sensor is adapted to capture a sequence of images under exposure of light from said light source, wherein said sequence of images contain a position-coding pattern for decoding a sequence of positions of the optical sensor device, said image sensor being adapted to capture said sequence of images by repeatedly capturing images as the optical sensor device is moved, said optical sensor device further comprising:

a processor which is adapted to receive each captured image in said sequence of images, from the image sensor and to decode the position of the optical sensor device; and a controller having a control output and being adapted to generate an exposure time control signal on said control output, said controller comprising an exposure time control loop in order to control exposure time for subsequently captured images in said sequence of images, wherein each iteration of the control loop involves:

calculating an error between a set value and an actual luminance condition value determined in a current image in said sequence of images;

calculating a current exposure time as a function of said error and an exposure time calculated during the preceding iteration of the control loop, said current exposure time being used for capturing a subsequent image in said sequence of images; and generating said exposure time control signal on said control output based on said current exposure time.

24. The sensor device according to claim 23, wherein said actual luminance condition value corresponds to a mean background luminance in said current image.

25. The sensor device according to claim 23, wherein said current exposure time is calculated so as to yield optimum contrast between the background and at least one object in a subsequent image which is captured in the following iteration of the control loop.

26. The sensor device according to claim 23, wherein said controller is adapted to operate with essentially constant poles, independent of operation condition of the sensor device.

27. The sensor device according to claim 23, wherein the control loop is based on a model function relating said actual luminance condition value to said preceding exposure time, wherein said controller is adapted to intermittently adjust said model function to a current operation condition of the optical sensor device, so tat the control loop operates with essentially constant poles, independent of operation condition of the sensor device.

28. The sensor device according to claim 23, wherein the control loop is based on a model function relating said actual luminance condition value to said preceding exposure time, said model function including at least one model function working point which is essentially common to all operation conditions of the optical sensor device, and wherein said controller is adapted to, in calculating said current exposure time, parameterize said model function based on said preceding exposure time and said model function working point, so that the control loop operates with essentially constant poles, independent of operation condition of the optical sensor device.

29. The sensor device according to claim 28, wherein said model function includes at least one parameter which is essentially invariant of operation condition of the optical sensor device, said parameter defining said model function working point, and wherein said controller is adapted to parameterize of said model function based on said preceding exposure time and said at least one essentially invariant parameter.

30. The sensor device according to claim 29, wherein said model function is a linear function of exposure time, said essentially invariant parameter being an offset parameter of said linear function .

31. The sensor device according to claim 28, wherein said controller is designed, in parameterizing said model function, to set said actual luminance condition value equal to said set value.

32. The sensor device according to claim 28, wherein the parameterization of said model function is further based on the actual luminance condition value calculated for said current image.

33. The sensor device according to claim 27, wherein said model function is defined around said set value.

34. A sensor device according to claim 23, wherein the control loop of said controller is given by:

$$\begin{cases} u(n) = u(n-1) + k_1(n)(e(n) - e(n-1)) + k_2(n)e(n) \\ e(n) = w - y(n) \\ k_1(n) = \dfrac{l_1}{w - L} u(n-1) \\ k_2(n) = \dfrac{l_2}{w - L} u(n-1) \end{cases}$$

where:
u(n) and u(n−1) are the current exposure time and the exposure time calculated during the preceding iteration of the control loop, respectively,
w is the set value for the actual luminance condition value,
y(n) is the actual luminance condition value in said current image, and
$l_1$, $l_2$ and L are constants.

35. The sensor device according to claim 23, wherein the control loop is implemented in a PI regulator.

36. The sensor device according to claim 23, wherein the illuminating light source is a light emitting diode.

37. The sensor device according to claim 36, wherein the light emitting diode is adapted to emit infrared light.

38. The sensor device according to claim 23, wherein said image sensor is arranged to capture said sequence of images of a surface which contains a position-coding pattern, said sensor device further comprising means for determining a position from the position-coding pattern in each image.

39. The sensor device according to claim 23, wherein the control output of said controller is operatively coupled to said light source and wherein the exposure time controlled by said control signal is a time period during which said light source is caused to emit light.

40. The sensor device according to claim 23, wherein the control output of said controller is operatively coupled to said image sensor and wherein the exposure time controlled by said control signal is a time period during which said image sensor will produce said image which is to be captured.

41. The sensor device according to claim 23, further comprising an optical member positioned in an optical path between said light source and said image sensor, wherein the control output of said controller is operatively coupled to said optical member and wherein the exposure time controlled by said control signal is a time period during which said optical member admits light emitted from said light source to reach said image sensor.

* * * * *